(12) United States Patent
Zhou et al.

(10) Patent No.: US 12,301,407 B2
(45) Date of Patent: May 13, 2025

(54) BEAM FAILURE DETECTION PER BEAM FOR MULTI-BEAM COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

( * ) Notice: Subject to any disclaimer, the term of this patent is extended or adjusted under 35 U.S.C. 154(b) by 340 days.

(21) Appl. No.: 17/504,819

(22) Filed: Oct. 19, 2021

(65) Prior Publication Data

US 2023/0118940 A1 Apr. 20, 2023

(51) Int. Cl.
*H04L 41/0668* (2022.01)
*G06N 20/00* (2019.01)
*H04L 41/0677* (2022.01)

(52) U.S. Cl.
CPC ......... *H04L 41/0668* (2013.01); *G06N 20/00* (2019.01); *H04L 41/0677* (2013.01)

(58) Field of Classification Search
CPC ............ H04L 41/0668; H04L 41/0677; H04B 7/06964
See application file for complete search history.

(56) References Cited

U.S. PATENT DOCUMENTS

| | | | | |
|---|---|---|---|---|
| 2020/0259545 A1* | 8/2020 | Bai | ...................... | H04B 7/0626 |
| 2021/0058797 A1* | 2/2021 | Yoshioka | .............. | H04B 7/0682 |
| 2021/0320838 A1* | 10/2021 | Lee | ........................ | H04L 5/0048 |
| 2022/0131591 A1* | 4/2022 | Huang | ................... | H04L 5/0051 |
| 2022/0132517 A1* | 4/2022 | Zhu | ....................... | H04L 5/0042 |
| 2022/0225135 A1* | 7/2022 | Cirik | ..................... | H04L 5/0091 |
| 2022/0225147 A1* | 7/2022 | Chen | ..................... | H04W 76/28 |
| 2023/0171836 A1* | 6/2023 | Butt | ....................... | H04W 76/19 370/216 |
| 2023/0328771 A1* | 10/2023 | Zhang | ................ | H04W 72/1263 370/225 |
| 2023/0353223 A1* | 11/2023 | Jia | ........................ | H04B 7/06964 |
| 2023/0362687 A1* | 11/2023 | Xu | .......................... | H04W 24/08 |

* cited by examiner

*Primary Examiner* — Michael A Keller

(57) ABSTRACT

Certain aspects of the present disclosure provide techniques for beam failure detection per beam. A method that may be performed by a user equipment (UE) includes communicating with a network entity via a plurality of beams associated with a cell; performing a beam failure detection procedure per beam of the plurality of beams; and triggering a beam failure recovery procedure for a first beam of the plurality of beams in response to detecting a first beam failure for the first beam.

28 Claims, 11 Drawing Sheets

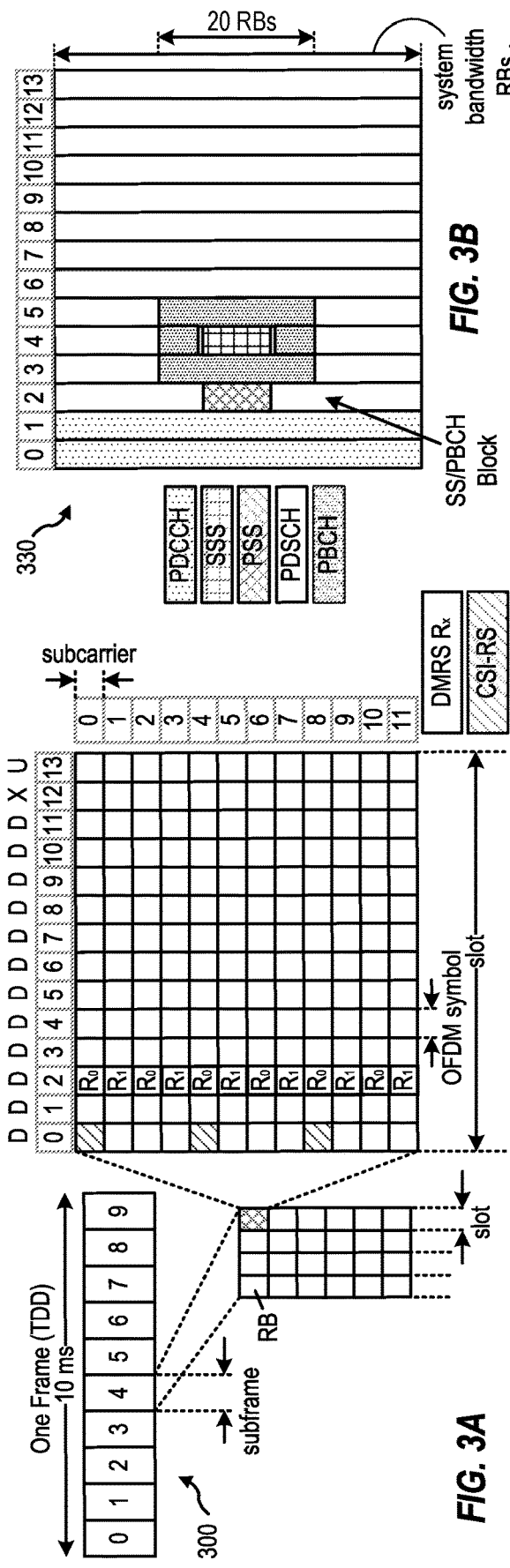
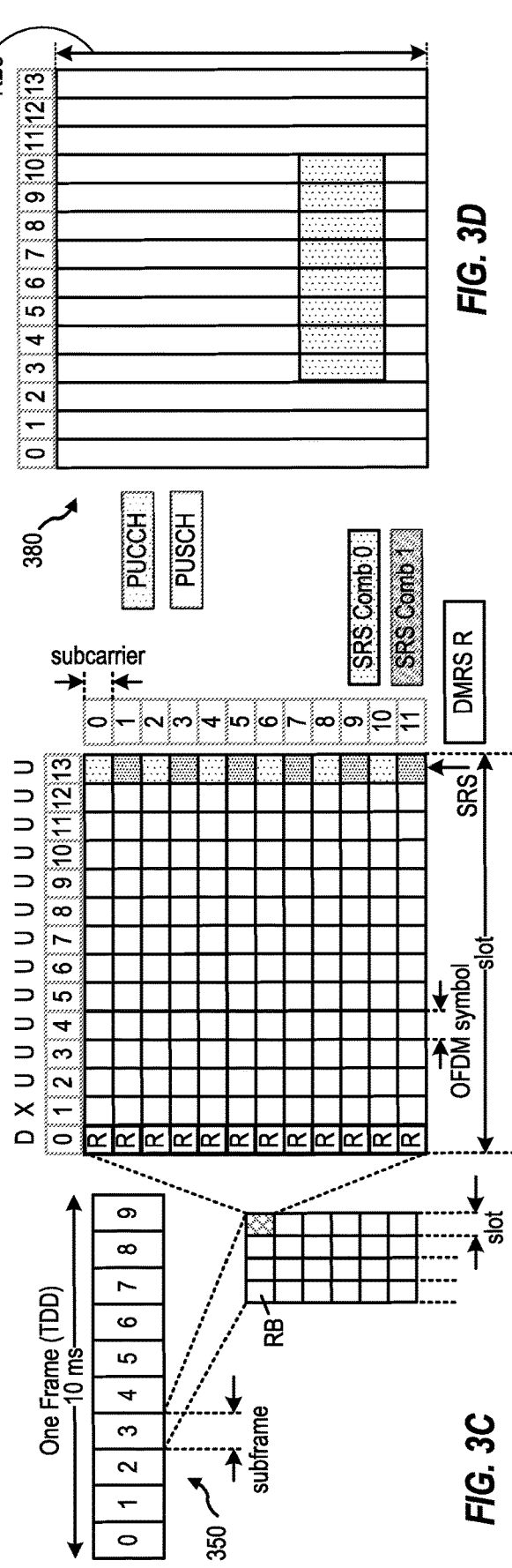

BEAM FAILURE DETECTION PER BEAM FOR MULTI-BEAM COMMUNICATIONS

BACKGROUND

Aspects of the present disclosure relate to wireless communications, and more particularly, to techniques for beam failure detection.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include beam failure detection per beam.

Certain aspects of the subject matter described in this disclosure can be implemented in a method for wireless communication by a user equipment (UE). The method generally includes communicating with a network entity via a plurality of beams associated with a cell; performing a beam failure detection procedure per beam of the plurality of beams; and triggering a beam failure recovery procedure for a first beam of the plurality of beams in response to detecting a first beam failure for the first beam.

Certain aspects of the subject matter described in this disclosure can be implemented in a method for wireless communication by a network entity. The method generally includes transmitting, to a UE, signaling indicating, for each beam of a plurality of beams associated with a cell, corresponding beam failure detection parameters for performing beam failure detection for the beam; communicating with the UE via the plurality of beams; and receiving, from the UE, a beam failure recovery request in response to a first beam failure for a first beam of the plurality of beams.

Certain aspects of the subject matter described in this disclosure can be implemented in an apparatus for wireless communication. The apparatus generally includes a memory and a processor coupled to the memory. The processor and the memory are configured to communicate with a network entity via a plurality of beams associated with a cell, perform a beam failure detection procedure per beam of the plurality of beams, and trigger a beam failure recovery procedure for a first beam of the plurality of beams in response to detecting a first beam failure for the first beam.

Certain aspects of the subject matter described in this disclosure can be implemented in an apparatus for wireless communication. The apparatus generally includes a memory and a processor coupled to the memory. The processor and the memory are configured to transmit, to a UE, signaling indicating, for each beam of a plurality of beams associated with a cell, corresponding beam failure detection parameters for performing beam failure detection for the beam; communicate with the UE via the plurality of beams; and receive, from the UE, a beam failure recovery request in response to a first beam failure for a first beam of the plurality of beams.

Certain aspects of the subject matter described in this disclosure can be implemented in an apparatus for wireless communication. The apparatus generally includes means for communicating with a network entity via a plurality of beams associated with a cell; means for performing a beam failure detection procedure per beam of the plurality of beams; and means for triggering a beam failure recovery procedure for a first beam of the plurality of beams in response to detecting a first beam failure for the first beam.

Certain aspects of the subject matter described in this disclosure can be implemented in an apparatus for wireless communication. The apparatus generally includes means for transmitting, to a UE, signaling indicating, for each beam of a plurality of beams associated with a cell, corresponding beam failure detection parameters for performing beam failure detection for the beam; means for communicating with the UE via the plurality of beams; and means for receiving, from the UE, a beam failure recovery request in response to a first beam failure for a first beam of the plurality of beams.

Certain aspects of the subject matter described in this disclosure can be implemented in a computer-readable medium. The computer-readable medium has instructions stored thereon for communicating with a network entity via a plurality of beams associated with a cell; performing a beam failure detection procedure per beam of the plurality of beams; and triggering a beam failure recovery procedure for a first beam of the plurality of beams in response to detecting a first beam failure for the first beam.

Certain aspects of the subject matter described in this disclosure can be implemented in a computer-readable medium. The computer-readable medium has instructions stored thereon for transmitting, to a user equipment (UE), signaling indicating, for each beam of a plurality of beams associated with a cell, corresponding beam failure detection parameters for performing beam failure detection for the beam; communicating with the UE via the plurality of beams; and receiving, from the UE, a beam failure recovery request in response to a first beam failure for a first beam of the plurality of beams.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for beam failure detection per beam.

In certain cases, a user equipment may declare beam failure only when radio conditions for all of the beams of a serving cell degrade to a certain level. Such a scheme for multi-beam failure detection may allow a UE to communicate with degraded radio conditions on a subset of the beams, which may provide undesirable wireless communication performance, such as low data rates and/or high latencies on the failing beams. In certain cases, the beam failure instance (BFI) counting mechanism for declaring beam failure and triggering beam failure recovery as described herein with respect to FIG. 4 may prematurely trigger the request for a new beam. Such a BFI counting mechanism may lead to increased signaling for beam failure recovery, spatial inefficiencies (e.g., beam usage), and/or spectral inefficiencies, due to the premature triggering of beam failure recovery.

Aspects of the present disclosure provide techniques and apparatus for beam failure detection consider multi-beam communications and temporary degradation of radio conditions. For example, each beam of a serving cell may undergo a separate beam failure detection procedure. In certain aspects, the beam failure detection procedure performed per beam may use the BFI counting mechanism described herein with respect to FIG. 4. In certain aspects, enhanced or different beam failure detection procedures may be used that consider temporary degradation of radio conditions or inaccurate measurements on a beam, such as a detection procedure that is adaptive (e.g., dynamically responsive) to consecutive BFIs being reported or uses a machine learning model to detect beam failure. As the temporary interference, blockage, or inaccurate measurements may discontinue, the UE may be able to continue communicating via the beam experiencing or reporting degraded radio conditions without initiating the beam failure recovery procedure.

The beam failure detection procedures described herein may enable faster and more accurate beam failure detection at the UE, for example, due to implementing beam failure detection per beam and/or being adaptive to temporary degraded radio conditions. The beam failure detection procedures described herein may improve wireless communication performance, such as improved latencies, data rates, spectral efficiencies, and/or spatial efficiencies.

Introduction to Wireless Communication Networks

Figure 1:
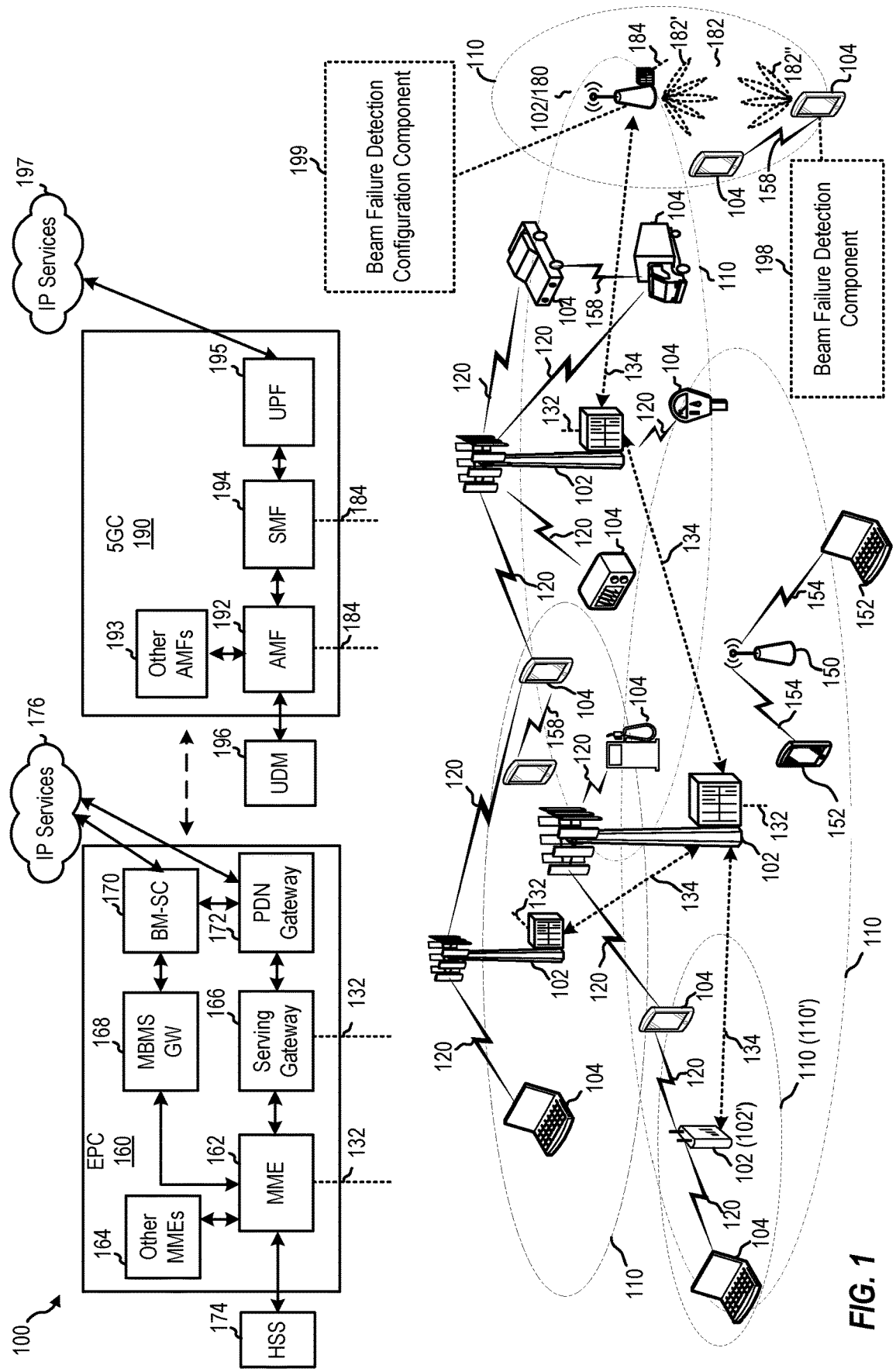
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming to communicate with a UE 104 via beams 182 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions of beams 182'. UE 104 may receive the beamformed signal from the base station 180 in one or more receive directions of beams 182". UE 104 may also transmit a beamformed signal to the base station 180 in one or more transmit directions of beams 182". Base station 180 may also receive the beamformed signal from UE 104 in one or more receive directions of beams 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

Wireless communication network 100 includes a beam failure detection configuration component 199, which may configure a UE with beam failure detection parameters as further described herein. Wireless network 100 further includes a beam failure detection component 198, which may perform beam failure detection per beam among a plurality of beams.

Figure 2:
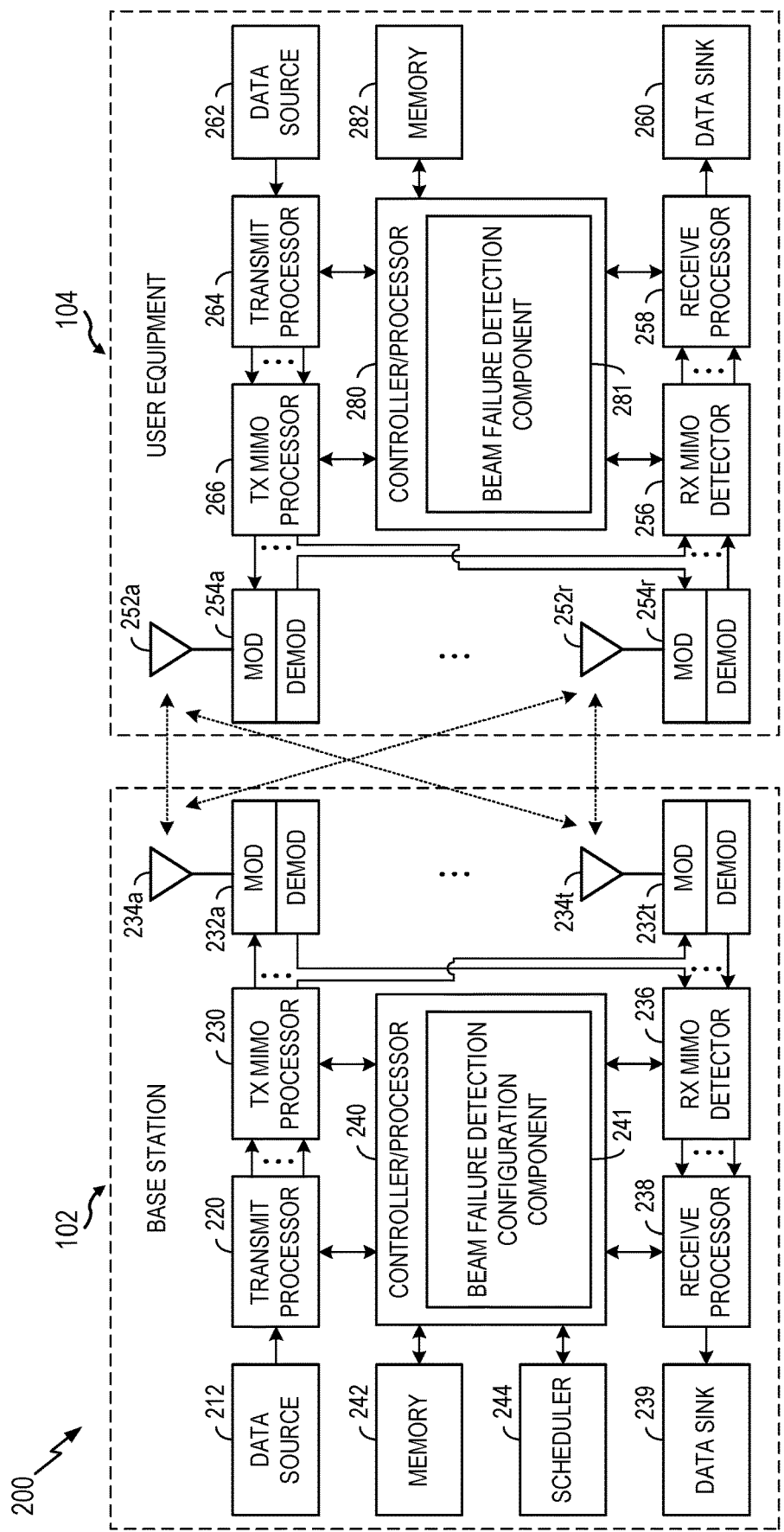
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a beam failure detection configuration component 241, which may be representative of the beam failure detection configuration component 199 of FIG. 1. Notably, while depicted as an aspect of controller/processor 240, a beam failure detection component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes a beam failure detection component 281, which may be representative of the beam failure detection component 198 of FIG. 1. Notably, while depicted as an aspect of controller/processor 280, the beam failure detection component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., the beams 182 depicted in FIG. 1) with a UE (e.g., 104) to improve path loss and range.

Further, as described herein, a UE may perform beam failure detection and recovery procedures for beamformed communications in mmWave bands and/or Sub-6 GHz bands.

Example Beam Failure Recovery

As radio conditions between a UE and network may degrade, for example, due to blockage and/or mobility, the UE may perform beam failure detection and recovery procedures to recover communications with the network, when a beam failure is detected for a beam. For example, for beam failure detection, the UE may periodically monitor the quality of a beam via a beam failure detection reference signal (BFD-RS) associated with the beam. If the UE detects a beam failure for the beam, for example, based on a block error rate (BLER) associated with the BFD-RS exceeding (or equal to) a threshold (e.g., 10%), the UE may initiate a beam failure recovery procedure, which may involve a random access channel (RACH) procedure, to request a new beam for communications with the network. For example, the UE may be configured with a list of candidate beams to use for the beam failure recovery and transmit the request for beam failure recovery via at least one of the candidate beams. A BFD-RS may include a reference signal used and/or configured for beam failure detection, such as one or more synchronization signal blocks (SSBs) and/or one or more channel state information reference signals (CSI-RSs). The BFD-RS may be transmitted by the network with a periodicity, for example, in periodic beam failure detection occasions, where a beam failure detection occasion may include one or more resources (e.g., frequency and/or time domain resources) and may be referred to as a detection occasion.

Figure 4:
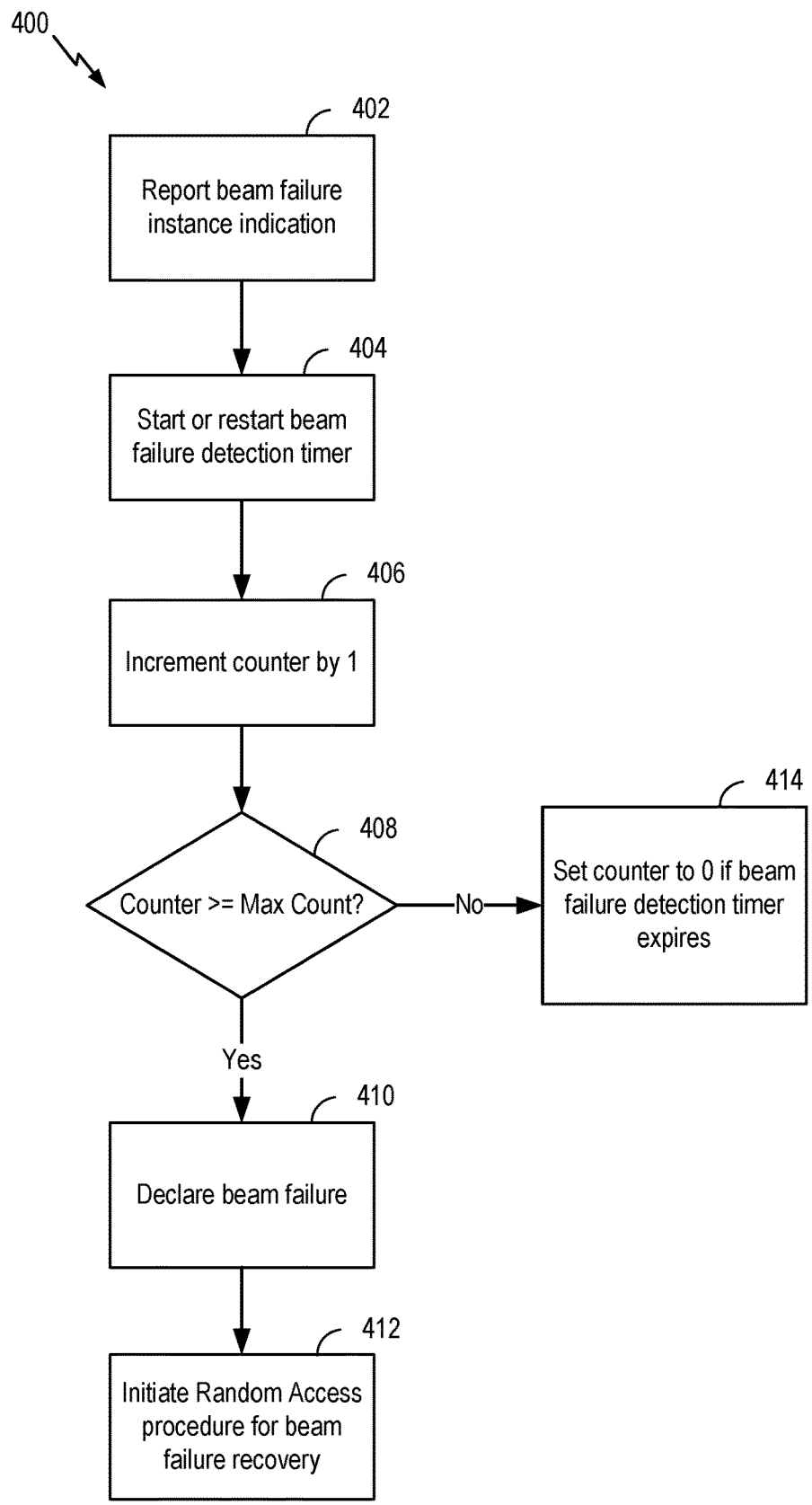
FIG. 4 is a flow diagram illustrating example operations for detecting beam failure and triggering beam failure recovery.

FIG. 4 is a flow diagram illustrating example operations 400 for detecting beam failure and triggering beam failure recovery. As shown, at step 402, a UE may internally report from a physical layer to a medium access control (MAC) layer a beam failure instance indication (BFI) at a detection occasion, for example, based on a BLER measured for a BFD-RS corresponding to a particular beam. For example, the physical layer may report the BFI to the MAC layer at the UE if the BLER for the BFD-RS is greater than or equal to a BLER threshold (e.g., 10%). The UE may receive the periodic BFD-RS associated with the beam and measure one or more signal properties associated with the BFD-RS to determine whether to report the BFI for a given detection occasion. The signal properties may include a channel quality indicator, signal-to-noise ratio (SNR), signal-to-interference plus noise ratio (SINR), signal-to-noise plus distortion ratio (SNDR), received signal strength indicator (RSSI), reference signal received power (RSRP), and/or BLER, for example.

At step 404, the UE may start or restart a beam failure detection timer (e.g., beamFailureDetectionTimer) in response to the BFI, where the beam failure detection timer may be used to determine whether to reset the counter at step 414. At step 406, the UE may increment a counter for the BFIs by a certain value (e.g., 1) in response to the BFI. At step 408, the UE may determine whether the value of the counter is greater than or equal to a counter threshold (e.g., a value of 1-10). At step 410, if the counter is greater than or equal to the max count threshold, the UE will declare beam failure for a beam. At step 412, the UE will trigger a RACH procedure for beam failure recovery to request a new beam for communications with the network. At step 414, if the counter is not greater than the counter threshold, the UE will monitor for subsequent reports for a BFI and the beam failure detection timer. If the timer expires before another BFI is reported, the UE will set the counter to zero.

In certain cases, the BFI counting mechanism for declaring beam failure and triggering beam failure recovery as described herein with respect to FIG. 4 may prematurely trigger the request for a new beam. The BFI counting mechanism may be susceptible to triggering beam failure recovery in situations where the UE is experiencing temporary degraded radio conditions, such as temporary interference from other wireless communication devices or temporary blockage, and/or inaccurate BFD-RS measurements, such as inaccuracies due to thermal conditions of the UE. For example, a burst of consecutive BFIs being reported may be indicative of temporary interference or blockage and/or inaccurate measurements. The BFI counting mechanism may lead to increased signaling for beam failure recovery, spatial inefficiencies (e.g., beam usage), and/or spectral inefficiencies, due to the temporary interference and/or blockage.

As a UE may communicate with a network entity via multiple beams on a serving cell, the UE may also monitor the beams for beam failure recovery. In certain cases, the UE may declare beam failure only when the radio conditions for all of the beams of a serving cell degrade to a certain level. For example, for each of the beams on a serving cell, the UE may estimate the BLER for the BFD-RSs corresponding to the beams. If the BLER for the BFD-RSs is greater than or equal to a BLER threshold (e.g., 10%), a beam failure instance indication (BFI) is reported from the physical layer to the medium access control (MAC) layer of a protocol layer stack at the UE. Beam failure is detected by counting the BFIs reported over a certain period, for example, according to a timer for beam failure detection, as further described herein.

Figure 5:
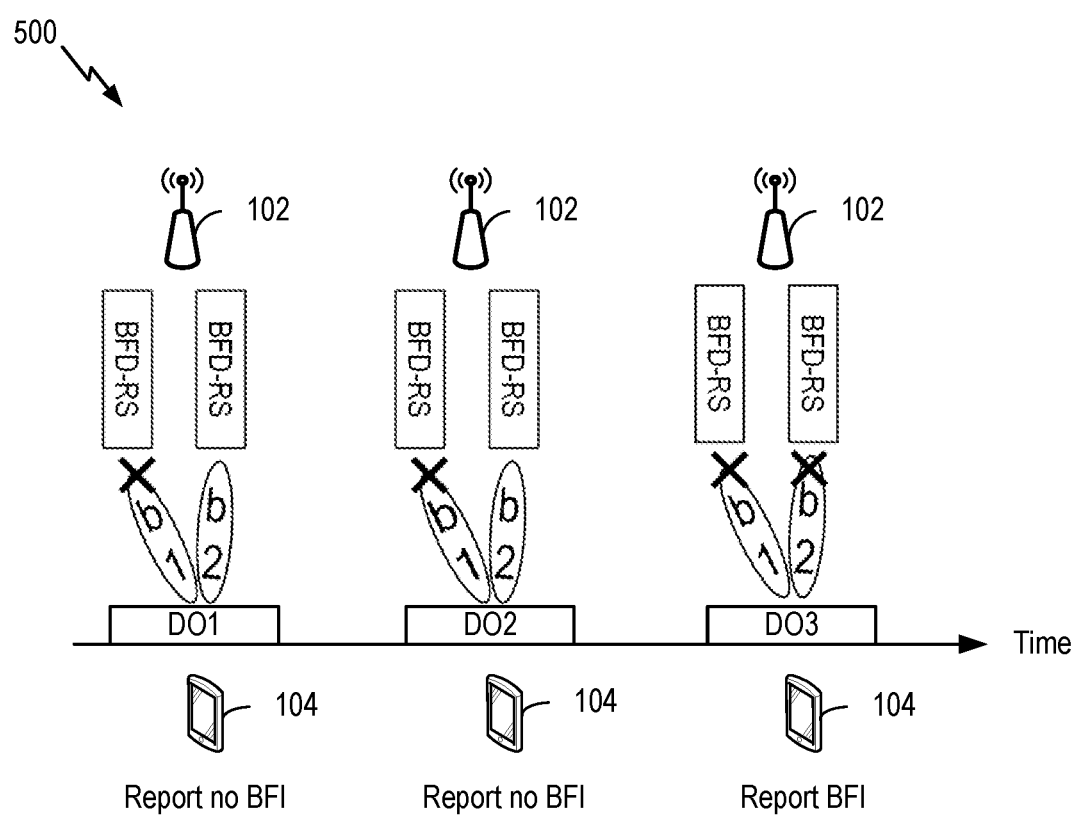
FIG. 5 is an example timeline for beam failure detection.

FIG. 5 depicts an example timeline 500 for beam failure detection of a first beam (b1) and a second beam (b2) at a UE 104. In this example, the UE 104 may monitor BFD-RSs associated with the first and second beams on a serving cell of the BS 102. As shown, in the first and second detection occasions (DO1 and DO2), the quality of the BFD-RS for the first beam may not satisfy a quality threshold (e.g., a BLER threshold), whereas the quality of the BFD-RS for the second beam may satisfy a quality threshold, such that the UE 104 will not report a BFI for the first and second detection occasions. In the third detection occasion (DO3), the BFD-RSs for the first and second beams may not satisfy the quality threshold, such that the UE 104 will report a single BFI for the third detection occasion. Such a scheme for multi-beam failure detection may allow a UE to communicate with degraded radio conditions on a subset of the beams, which may provide undesirable wireless communication performance, such as low data rates and/or high latencies on the failing beams.

Accordingly, what is needed are techniques and apparatus for beam failure detection that can be adaptive to multi-beam communications and/or temporary degradation of radio conditions.

Aspects Related to Beam Failure Detection Procedure for Multi-Beam Communications Aspects of the present disclosure provide techniques and apparatus for beam failure detection consider multi-beam communications and temporary degradation of radio conditions. For example, each beam of a serving cell may undergo a separate beam failure detection procedure. In certain aspects, the beam failure detection procedure performed per beam may use the BFI counting mechanism described herein with respect to FIG. 4. In certain aspects, the beam failure detection procedure may be enhanced to consider temporary degradation of radio conditions or inaccurate measurements on a beam, such as a procedure that is adaptive (e.g., dynamically responsive) to consecutive BFIs being reported or uses a machine learning model to detect beam failure. As the temporary interference, blockage, or inaccurate measurements may discontinue, the UE may be able to continue communicating via the beam experiencing or reporting degraded radio conditions without initiating the beam failure recovery procedure. In certain aspects, the beam failure detection procedure may provide more information in a beam failure report, including for instance, a beam failure reason. The UE may indicate more than one new beam for recovery and let the network to choose the new beam(s).

The beam failure detection procedures described herein may enable faster and more accurate beam failure detection at the UE, for example, due to implementing beam failure detection per beam and/or being adaptive to temporary degraded radio conditions. The beam failure detection procedures described herein may facilitate consistent services at the UE, for example, by making sure at least one beam is functional for wireless communications. The beam failure detection procedures described herein may allow the UE to distinguish between beam failure due to interference or noise, for example, by considering consecutive BFIs being reported. The beam failure detection procedures described herein may avoid prematurely requesting a beam switch, for example, due to temporary interference or blockage and/or inaccurate measurements. The beam failure detection procedures described herein may improve wireless communication performance, such as improved latencies, data rates, spectral efficiencies, and/or spatial efficiencies.

Figure 6:
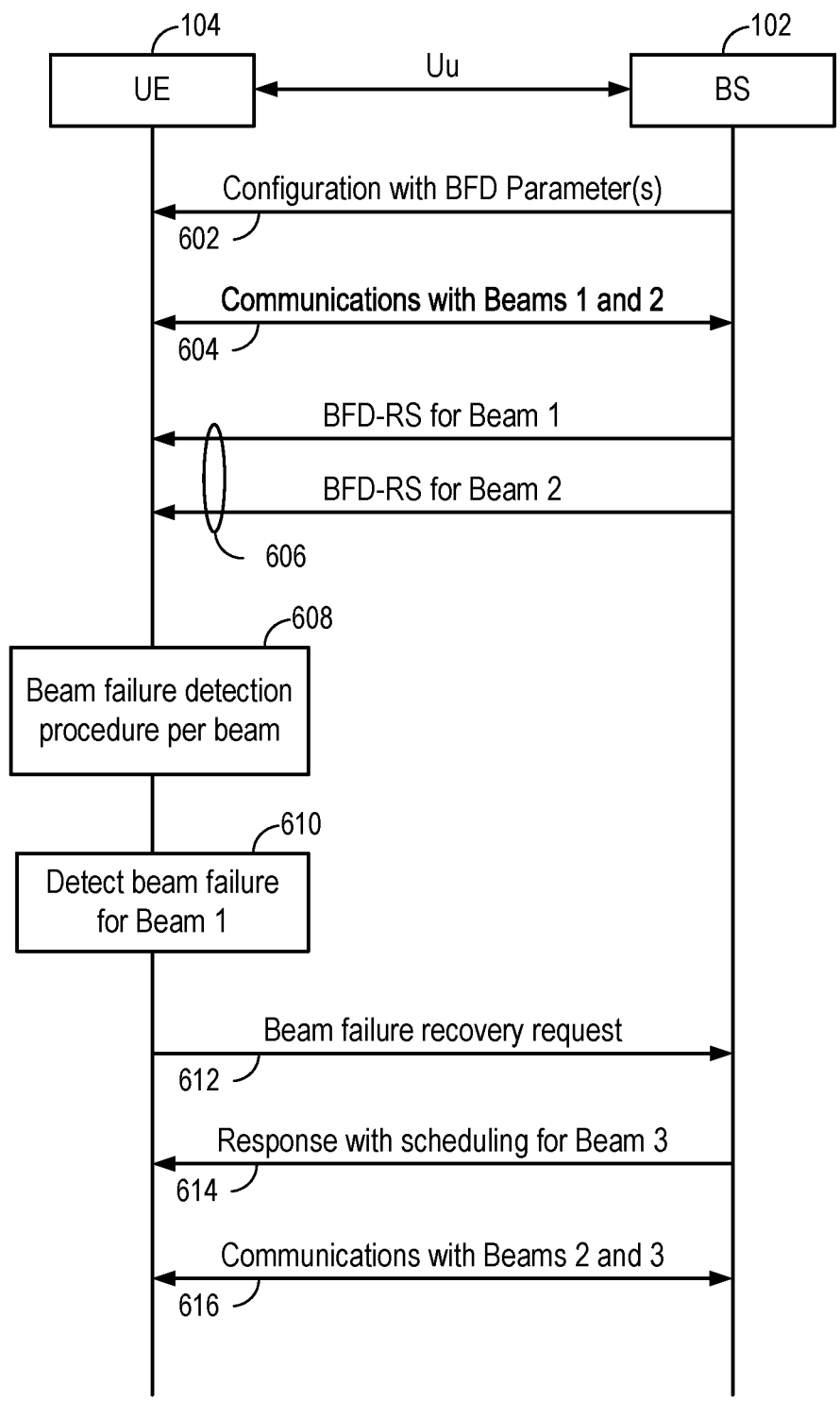
FIG. 6 depicts a signaling flow of example operations for beam failure detection per beam.

FIG. 6 depicts a signaling flow of example operations for beam failure detection per beam, in accordance with certain aspects of the present disclosure. Optionally, at step 602, the UE 104 may receive, from the BS 102, signaling indicating a configuration with one or more beam failure detection parameters, for each beam, as further described herein. Each beam may be associated with a set of parameters to use for beam failure detection. In certain cases, the set of parameters may be different for certain beams, for example, due to different service priorities. The beam failure detection parameters per beam may include a beam failure detection timer value and/or a counter threshold, for example, as described herein with respect to FIG. 4. For an adaptive procedure, the beam failure detection parameters per beam may include an indication of a function for determining the corresponding counter based on the number of consecutive times the BFI occurs for the beam, or one or more parameters for the function, as further described herein.

In certain aspects, the UE may be preconfigured with default values for certain beam failure detection parameters. The UE may perform the beam failure detection procedures described herein using the default values if the UE does not receive signaling indicating a configuration for the beam failure detection procedures.

At step 604, the UE 104 may communicate with the BS 102 via multiple beams, such as a first beam (Beam 1) and a second beam (Beam 2), on a serving cell. For example, the UE 104 may transmit data to the BS 102 via the first beam and receive data from the BS 102 via the second beam.

At step 606, the UE 104 may monitor the BFD-RSs associated with the first and second beams in the corresponding detection occasions for the beams. For example, the UE 104 may receive, from the BS 102, BFD-RSs associated with the first and second beams in periodic detection occasions, for example, as described herein with respect to FIG. 5. In certain aspects, the BFD-RSs associated with different beams may be received in different detection occasions, the same detection occasions, or overlapping detection occasions. The UE 104 may measure one or more signal properties of the BFD-RSs in the detection occasions.

At step 608, the UE 104 may perform a beam failure detection procedure for each of the first and second beams on the serving cell of BS 102. The UE 104 may perform beam failure detection procedure for the first beam and a separate beam failure detection procedure for the second beam. For example, the UE 104 may perform the BFI counting mechanism, as described herein with respect to FIG. 4, for at least one of the first and second beams. In certain aspects, the UE 104 may perform one or more of the adaptive beam failure detection procedures as further described herein.

At step 610, the UE 104 may detect a beam failure for the first beam. For example, due to the mobility of the UE 104, the UE 104 may no longer be in the coverage area associated with the first beam, such that the signal quality of the BFD-RS corresponding to the first beam is degraded.

At step 612, the UE 104 may transmit, to the BS 102, a beam failure recovery request in response to the detected beam failure for the first beam. The UE 104 may transmit a RACH preamble specific for beam failure recovery as the beam failure recovery request. In certain cases, the UE 104 may use a candidate beam (e.g., a third beam) configured for beam failure recovery to transmit the RACH preamble.

At step 614, the UE 104 may receive, from the BS 102, a response with scheduling for the third beam (Beam 3). For example, the UE 104 may receive a random access response with the scheduling for a RACH response, where the scheduling effectively instructs the UE 104 to switch from the first beam to using the third beam for wireless communications.

At step 616, the UE 104 may communicate with the BS 102 via the second and third beams. The beam failure detection procedure performed per beam may enable the UE 104 to maintain communications with the BS 102 via the second beam as the UE 104 recovers communications via the third beam.

Figure 7A:
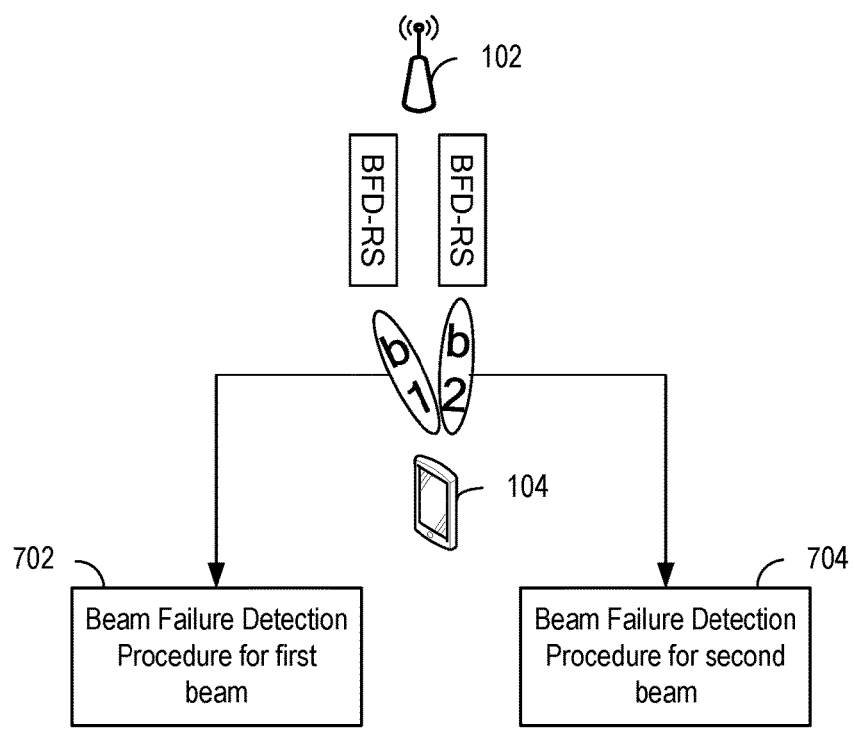
FIG. 7A depicts an example diagram of performing beam failure detection per beam.

FIG. 7A depicts an example diagram of performing beam failure detection per beam, in accordance with certain aspects of the present disclosure. As shown, the UE 104 may perform a first beam failure detection procedure for a first beam (b1) and a second beam failure detection procedure for a second beam (b2), where BFD-RSs are associated with the first and second beams. As an example, the first beam failure detection procedure may include a BFI counting mechanism, for example, as described with respect to FIG. 4. The second beam failure detection procedure may include an adaptive BFI counting procedure as further described herein.

Figure 7B:
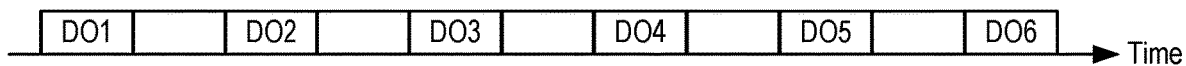
FIG. 7B depicts an example sequence of detection occasions over time.

FIG. 7B depicts an example sequence of detection occasions over time, where the UE may adapt the beam failure detection procedure based on the number of consecutive BFIs within the sequence, in accordance with certain aspects of the present disclosure. In this example, a UE may be configured to monitor a BFD-RS associated with a specific beam (e.g., b1 in FIG. 7A) in periodic detection occasions shown as DO1-DO6. For example, in the case of an SSB based BFD-RS, the UE may measure the signal properties of the BFD-RS with a half frame periodicity (e.g., 5 ms). In certain cases, the UE may experience temporary degradation in radio conditions, for example, such that the UE reports BFIs in consecutive detection occasions DO2, DO3, and DO4. For example, the UE may measure a degraded state (e.g., a BLER>BLER threshold) associated with the BFD-RS that is considered a BFI in each of the detection occasions DO2, DO3, and DO4. In other words, consecutive BFIs may occur in DO2, DO3, and DO4. In the other detection occasions (DO1, DO5, and DO6), the UE may not report a BFI, or a BFI may not occur.

The sequence of consecutive BFIs may vary. For example, the UE may encounter two consecutive BFIs in DO1 and DO2 or six consecutive BFIs in DO1-DO6. As further described herein, the UE may adapt the mechanism for counting BFIs to consider the occurrence of consecutive BFIs in the sequence of detection occasions. For example, the UE may adjust the weight of the consecutive BFIs used to increment the counter, adjust the counter, and/or adjust the counter threshold based on the number of consecutive BFIs in the sequence of detection occasions.

Figure 8:
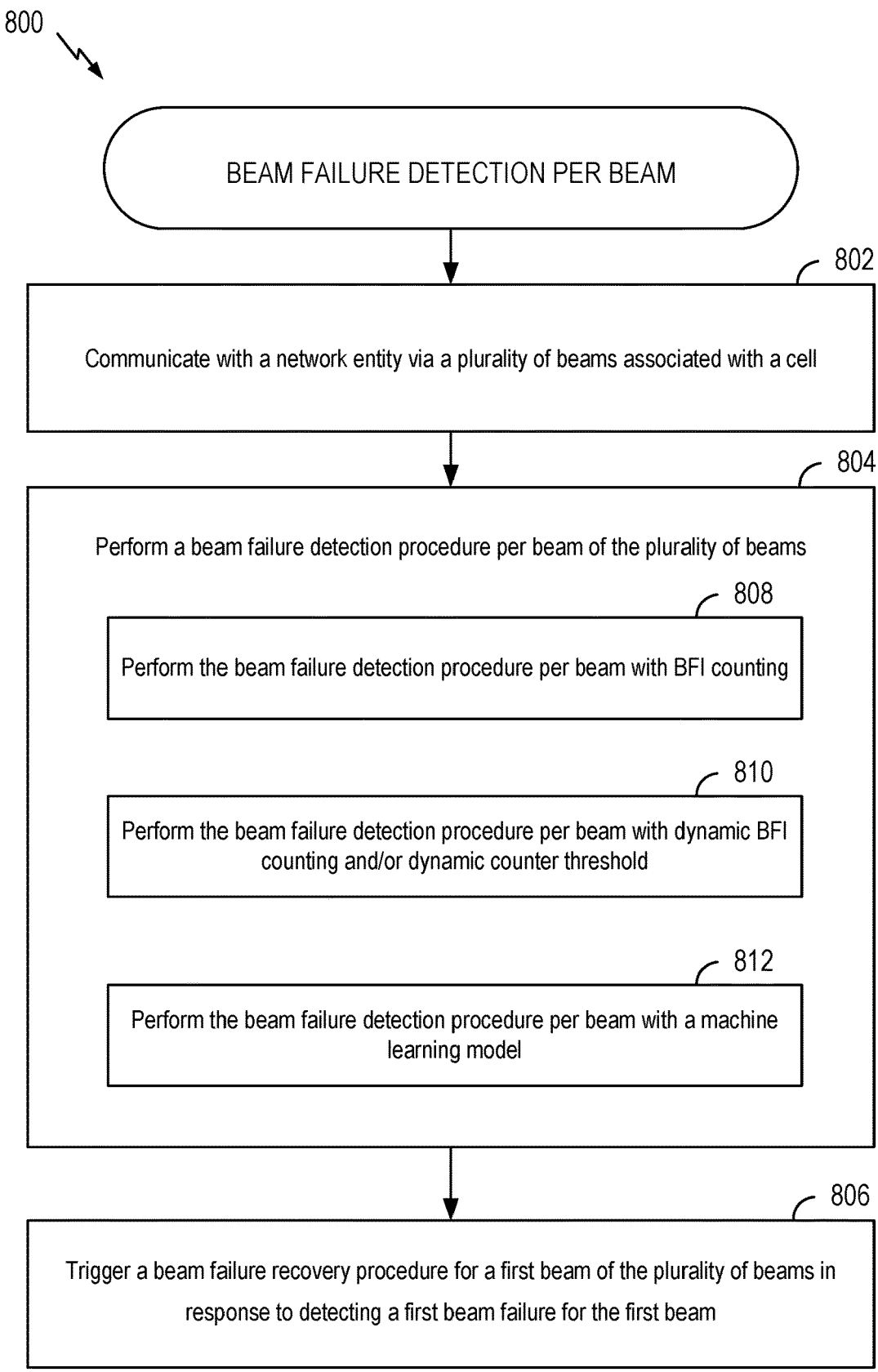
FIG. 8 is a flow diagram illustrating example operations for wireless communication, for example, by a user equipment.

FIG. 8 is a flow diagram illustrating example operations 800 for wireless communication, in accordance with certain aspects of the present disclosure. The operations 800 may be performed, for example, by a UE (such as the UE 104 in the wireless communications system 100). The operations 800 may be implemented as software components that are executed and run on one or more processors (e.g., controller/processor 280 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 may optionally begin, at block 802, where the UE may communicate with a network entity (e.g., the BS 102) via a plurality of beams (e.g., the beams 182) associated with a cell. For example, the UE may receive data from the network via a first beam (e.g., b1 in FIG. 7A) and transmit data to the network via a second beam (e.g., b2 in FIG. 7B) on the same serving cell. The cell may include a particular carrier of a network entity. The cell may include a transmit-receive point (TRP), such as a remote radio head or antenna panel, of a network entity.

At block 804, the UE may perform a beam failure detection procedure per beam of the plurality of beams. For example, the UE may monitor for a beam failure for each of the beam separately using the BFI counting mechanism, as described herein, with respect to FIG. 4. Optionally, at block 808, block 810, and/or block 812, the UE may perform one or more of the example beam failure detection procedures per beam as further described herein.

At block 806, the UE may trigger a beam failure recovery procedure for a first beam of the plurality of beams in response to detecting a first beam failure for the first beam. For example, the UE may initiate a RACH procedure that requests a new beam from the network as the beam failure recovery procedure. In certain cases, the UE may transmit the request via a candidate beam.

In certain aspects, the UE may perform the BFI counting mechanism as the beam failure detection procedure at block 804 for at least one of the beams, for example, as described herein with respect to FIG. 4. Referring to FIG. 8, at block 808, the UE may perform the beam failure detection procedure per beam with BFI counting. The UE may measure signal properties of the BFD-RSs associated with the beams, and the UE may use separate beam failure detection procedures for each of the beams to determine whether a beam failure has occurred for a beam based on the measured signal properties.

The UE may maintain, for each beam (or for at least one of the beams), a corresponding counter based on a number of times a BFI occurs for the beam. Detecting the first beam failure for the first beam may include detecting that the corresponding counter for the first beam satisfies a first counter threshold, for example, the counter being greater than or equal to the first counter threshold. In aspects, a BFI may occur for the beam when a quality of the beam fails to satisfy a quality threshold as evidenced by a signal property measured for the BFD-RS associated with the beam, such as a signal property and threshold in terms of SNR, SINR, RSSI, RSRP, and/or BLER. For example, a BFI may be considered to have occurred based on a BLER for a BFD-RS is greater than or equal to a BLER threshold. In aspects, the MAC protocol layer may maintain separate beam failure detection procedures for each beam.

For certain aspects, the BFI counting mechanism may use a timer to determine when to reset the counter, for example, as described herein with respect to FIG. 4. The UE may start, for each beam (or for at least one of the beams), a corresponding beam failure detection timer in response to the BFI occurring for the beam and reset the corresponding counter upon expiration of the beam failure detection timer.

According to certain aspects, the UE may be configured with parameters for the beam failure detection procedures, for example, as described herein with respect to FIG. 7. Beam failure detection parameters may be individually configured for each beam. For example, the UE may have values for the beam failure detection timer (e.g., $timer_i$, where i indicates a beam index) and the counter threshold (e.g., $maxCount_i$) associated with different beams. In certain aspects, the UE may receive signaling indicating, for each beam (or at least one of the beams), corresponding beam failure detection parameters including at least one of a beam failure detection timer value or a counter threshold.

In certain aspects, at block 810, the UE may perform the beam failure detection procedure per beam with dynamic (adaptive) BFI counting and/or a dynamic (adaptive) counter threshold, for example, adjusting the increment of the counter and/or counter threshold based on a number of consecutive BFIs. For example, the beam failure detection procedure may use a BFI counting mechanism as described herein with respect to FIG. 4, with one or more enhancements for the dyna BFI counting and/or dynamic counter threshold.

The dynamic BFI counting may consider the BFI reporting pattern (such as consecutive BFI occurrences or single BFI occurrences) in determining how much to adjust the corresponding counter. An occurrence of consecutive BFIs being reported (e.g., the number of consecutive BFIs in a sequence of detection occasions as described herein with respect to FIG. 7B) may indicate a temporary degradation of radio conditions and/or temporary inaccurate measurements. The UE may adjust the impact of consecutive BFIs using a dynamic counting technique, for example. The UE may maintain, for each beam (or for at least one of the beams), the corresponding counter based at least in part on a number of consecutive times the BFI occurs for the beam in a sequence of occasions, for example, as described herein with respect to FIG. 7B. In certain aspects, the UE may adjust the amount to increment the counter for a sequence of consecutive BFIs using a specific function (e.g., $f(BFI_{consecutive})$), such as a product of a first parameter and the number of consecutive BFIs.

As an example, suppose the first parameter has a value of 0.5, and the consecutive BFIs are in detection occasions DO2-DO5, as depicted in FIG. 7B. As a result, the UE detects four consecutive BFIs. A product of the first parameter and the number of consecutive BFIs would equal two, and the UE may increment the corresponding counter by two for the consecutive BFIs, which will dampen the impact of the consecutive BFIs on declaring beam failure for a particular beam. Such a scheme may enable the UE to continue to communicate on a beam in cases of temporary degradation of radio conditions and/or measurement inaccuracies.

In certain aspects, the UE may select the specific function to use for adjusting the consecutive BFIs and/or the corresponding counter, for example, based on the number of consecutive BFIs. The function may increase the consecutive BFIs and/or the BFI counter slowly when the consecutive BFIs is small, and the function may increase the consecutive BFIs and/or the BFI counter quickly (e.g., exponentially) when the consecutive BFIs is large. When a non-consecutive BFI is reported, the UE may increment the BFI counter by at least one. As an example, the UE may determine the function for adjusting the consecutive BFIs (and/or the counter) using the following expression:

$$y = \begin{cases} a*BFI_{consecutive}, & BFI_{consecutive} < T \\ BFI_{consecutive}^b, & BFI_{consecutive} \geq T \end{cases} \quad (1)$$

where y is the value of the increment used to increase the counter, for example, at step 406; $BFI_{consecutive}$ is the total number of consecutive BFIs occurring in a sequence of detection occasions; a is a first parameter used to adjust the count for consecutive BFIs in a first function; b is a second parameter used to adjust the count for consecutive BFIs in a second function; and T is the threshold value for selecting the given function for adjusting the consecutive BFIs. In certain cases, the first and second parameters (a and b) may be constant, where $0<a<1$, and $b>1$. In certain aspects, y may be the value of the adjusted counter, where $BFI_{consecutive}$ is replaced with the counter value in the product and exponential functions, for example. Those of skill in the art will understand that the parameters and functions in Expression (1) are merely examples. Other parameters and/or functions may be used in addition or instead of those provided in Expression (1).

The UE may increment the corresponding counter by at least a first value of a first function (e.g., $a*BFI_{consecutive}$) of the number of consecutive times the BFI occurs (or the number of times the BFI occurs) for the beam if the number of consecutive times the BFI occurs for the beam does not satisfy a first threshold. The UE may increment the corresponding counter by at least a second value of a second function (e.g., $BFI_{consecutive}^b$) of the number of consecutive times the BFI occurs (or the number of times the BFI occurs) for the beam if the number of consecutive times the BFI occurs for the beam satisfies the first threshold. The first function may include a product of a first parameter and the number of consecutive times the BFI occurs (or the number of times the BFI occurs) for the beam, and the second function may include the number of consecutive times the BFI occurs (or the number of times the BFI occurs) for the beam raised to the power of a second parameter, for example, as described herein with respect to Expression (1). The first parameter has a first value between zero and one, and the second parameter has a second value greater than one.

For certain aspects, the UE may adjust the counter threshold, for example, based on a number of consecutive BFIs. The counter threshold may adapt to the number of consecutive BFIs detected by the UE. The UE may determine the counter threshold based at least in part on a number of consecutive times the BFI occurs for a beam in a sequence of occasions.

The counter threshold may be set to a value greater than a base value when the number of consecutive BFIs is small and set to a value less than a base value when the number of consecutive BFIs is large. The UE may determine the value for the counter threshold according to the following expression:

$$maxCount = \begin{cases} C+a, & BFI_{consecutive} < T \\ C-b, & BFI_{consecutive} \geq T \end{cases} \quad (2)$$

where maxCount is the counter threshold value, for example, used at step 408, C is the base value for the counter threshold, a is a first parameter for increase the base value, and b is a second parameter for decreasing the base value. In aspects, the first and second parameters may have the same or different values greater than zero. When a non-consecutive BFI is reported, the UE may use the base value for the counter threshold. The counter threshold for a beam may be adjusted when at the next occurrence of consecutive BFIs.

As an example with respect to the first beam, the UE may determine the first counter threshold based at least in part on a number of consecutive times the BFI occurs for the first beam in a sequence of occasions. The UE may set the first counter threshold to a first value (e.g., C+a) if the number of consecutive times the BFI occurs for the first beam does not satisfy a first threshold. The UE may set the first counter threshold to a second value (e.g., C−b) less than the first value if the number of consecutive times the BFI occurs for the first beam satisfies the first threshold.

In certain aspects, at block 812, the UE may perform the beam failure detection procedure per beam using a machine learning model. The UE may use a machine learning model that is trained to detect a beam failure for a beam. The machine learning model may take as inputs the BFI reports for a certain duration, channel conditions for a beam, and/or one or more signal properties of a BFD-RS associated with a beam. The machine learning model may include a neural network and/or regression analysis, for example. The machine learning model may indicate when a beam failure occurs to trigger beam failure recovery. In certain cases, the UE may autonomously select or generate a machine learning algorithm for determining beam failure, for example, from a pool of machine learning algorithms preconfigured or configured by the network.

With respect to the first beam, the machine learning model may take as input at least one of a number of times a BFI occurs for the first beam or channel condition measurements associated with the first beam. The machine learning model may output detection of the first beam failure based on the input.

As described herein, the UE may be configured with beam failure detection parameters via the network or preconfigured parameters. For dynamic BFI counting, the beam failure detection parameters may include an indication of a function for determining the corresponding counter based on the number of consecutive times the BFI occurs for the beam, or one or more parameters for the function (e.g., the first and second parameters). For example, the indication of the function may indicate to use a particular function or a dynamic function, such as Expression (1). For a dynamic counter threshold, the beam failure detection parameters for a beam may include an indication of a function (e.g., Expression (2)) for determining a corresponding counter threshold, or one or more parameters for the function (e.g., the parameters a and b in Expression (2)). For a machine learning model, the beam failure detection parameters may include at least one of an indication of a machine learning algorithm for detecting beam failure (e.g., neural network or regression analysis), an indication of training data for the machine learning algorithm, or one or more parameters for the machine learning algorithm.

In certain aspects, the UE may be configured with the beam failure detection parameters by the network, for example, as described herein with respect to FIG. 6. The UE may receive a configuration with beam failure detection parameters, for example, via radio resource control (RRC) signaling, medium access control (MAC) signaling, downlink control information (DCI), and/or system information. For example, the UE may be configured with multiple parameter values via RRC signaling, and the network may switch parameter values using MAC signaling and/or DCI.

The UE may request to switch parameter values, for example, using MAC signaling and/or uplink control information (UCI).

The UE may perform beam failure detection per beam with the same beam failure detection procedure (e.g., BFI counting) used for each beam or a set of beams. In certain cases, the UE may perform the beam failure detection per beam with a different beam failure detection procedure (e.g., BFI counting for a first beam and dynamic counting for a second beam) used across the beams or a set of beams. Such a combination of detection procedures may enable the UE to be configured with different priorities for detecting beam failure for different services assigned to the beam, for example.

Figure 9:
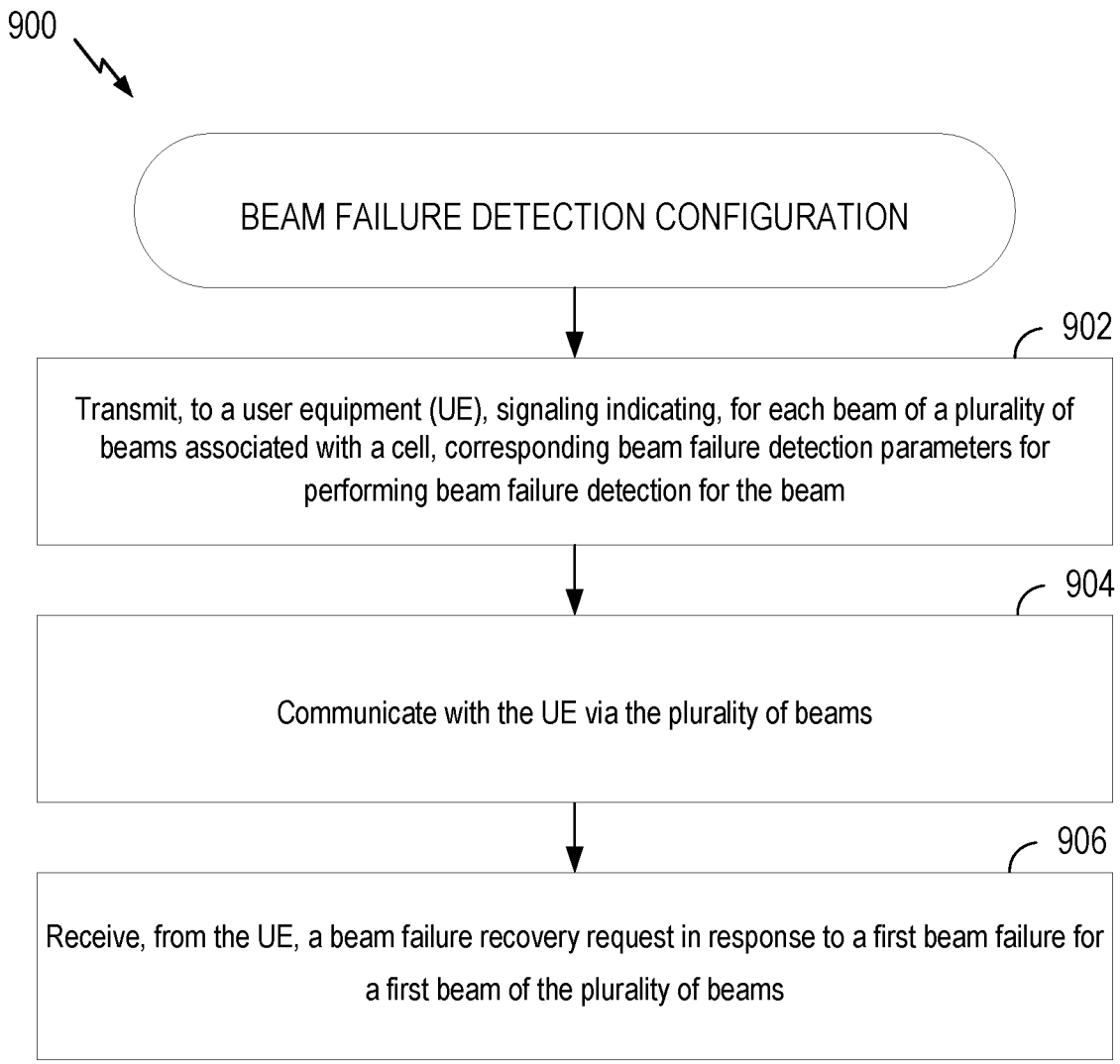
FIG. 9 is a flow diagram illustrating example operations for wireless communication, for example, by a network entity.

FIG. 9 is a flow diagram illustrating example operations 900 for wireless communication, in accordance with certain aspects of the present disclosure. The operations 900 may be performed, for example, by a network entity (such as the BS 102 in the wireless communications system 100). The operations 900 may be complementary to the operations 800 performed by the UE. The operations 900 may be implemented as software components that are executed and run on one or more processors (e.g., controller/processor 240 of FIG. 2). Further, the transmission and reception of signals by the network entity in operations 900 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

The operations 900 may optionally begin, at block 902, where the network entity may transmit, to a UE (e.g., the UE 104), signaling indicating, for each beam of a plurality of beams associated with a cell, corresponding beam failure detection parameters for performing beam failure detection for the beam. For example, the network entity may configure the UE with sets of beam failure detection parameters, where each set of beam failure detection parameters is specific to a particular beam among the plurality of beams, such as the first and second beams (b1, b2) depicted in FIG. 7A.

At block 904, the network entity may communicate with the UE via the plurality of beams. For example, the network may transmit data to the UE via a first beam (e.g., b1 in FIG. 7A) and receive data from the UE via a second beam (e.g., b2 in FIG. 7B) on the same serving cell.

At block 906, the network entity may receive, from the UE, a beam failure recovery request in response to a first beam failure for a first beam of the plurality of beams. For example, the network entity may receive a RACH preamble associated with beam failure recovery. In certain cases, the RACH preamble may be received via a candidate beam selected by the UE.

In certain aspects, the network entity may configure the UE with the beam failure detection parameters, for example, as described herein with respect to FIG. 6. For each beam (or at least one of the beams), the corresponding beam failure detection parameters may include at least one of a beam failure detection timer value or a counter threshold. For dynamic BFI counting, the corresponding beam failure detection parameters for a beam may include at least one of an indication of a function for determining a corresponding counter based on a number of consecutive times a BFI occurs for the beam, or one or more parameters for the function. For dynamic counter threshold, the corresponding beam failure detection parameters for a beam may include at least one of an indication of a function for determining a corresponding counter threshold, or one or more parameters for the function. For machine learning, the corresponding beam failure detection parameters for a beam may include at least one of an indication of a machine learning algorithm for detecting beam failure, an indication of training data for the machine learning algorithm, or one or more parameters for the machine learning algorithm.

Example Wireless Communication Devices

Figure 10:
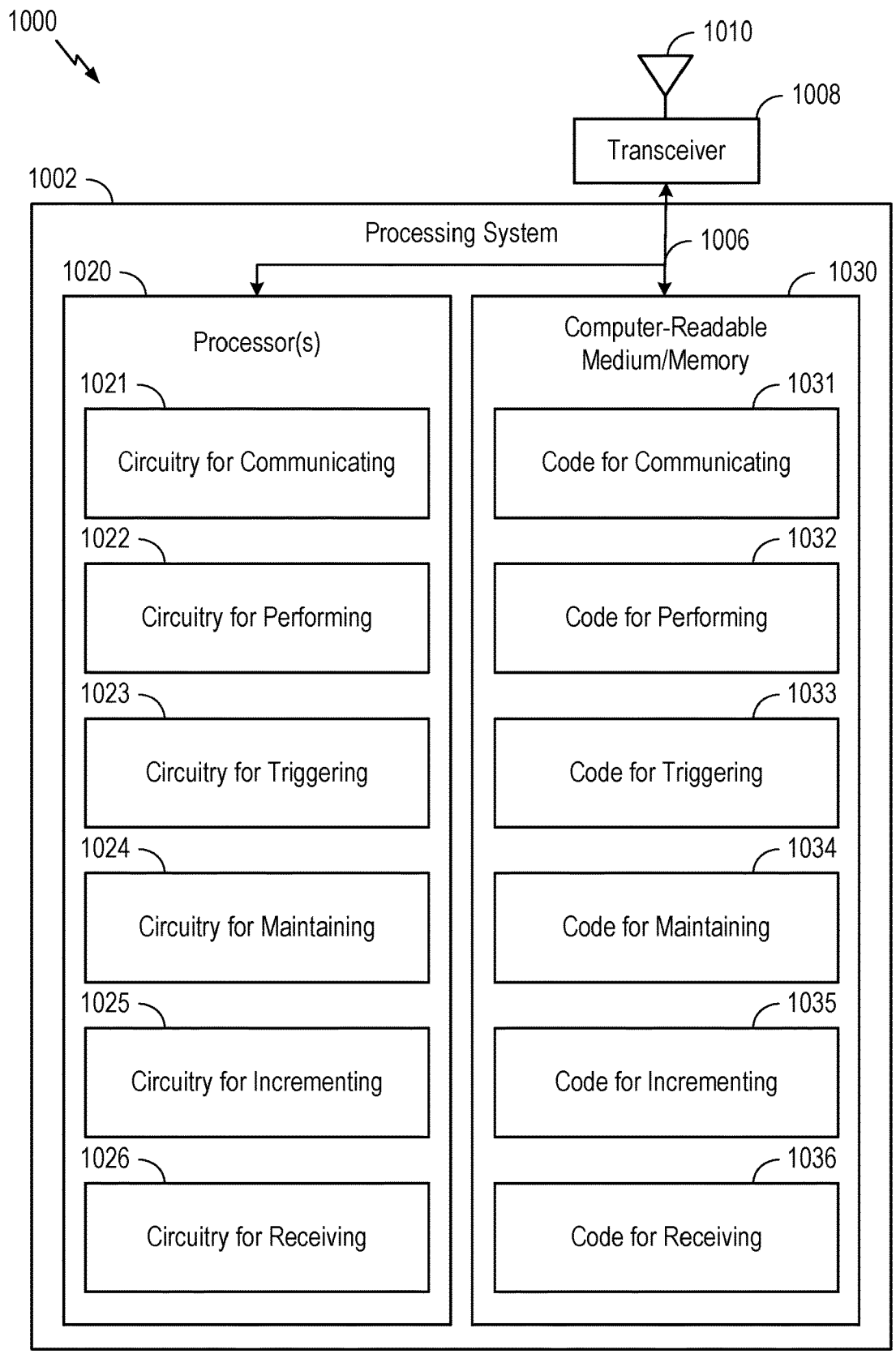
FIG. 10 depicts aspects of an example communications device.

FIG. 10 depicts an example communications device 1000 that includes various components operable, configured, or adapted to perform operations for the techniques disclosed herein, such as the operations depicted and described with respect to FIGS. 6-8. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 6-8, or other operations for performing the various techniques discussed herein for beam failure detection per beam.

In the depicted example, computer-readable medium/memory 1030 stores code 1031 for communicating (e.g., transmitting and/or receiving), code 1032 for performing, code 1033 for triggering, code 1034 for maintaining, code 1035 for incrementing, and/or code 1036 for receiving.

In the depicted example, the one or more processors 1020 include circuitry configured to implement the code stored in the computer-readable medium/memory 1030, including circuitry 1021 for communicating, circuitry 1022 for performing, circuitry 1023 for triggering, circuitry 1024 for maintaining, circuitry 1025 for incrementing, and circuitry 1026 for receiving.

Various components of communications device 1000 may provide means for performing the methods described herein, including with respect to FIGS. 6-8.

In some examples, means for transmitting or sending (or means for outputting for transmission or means for communicating) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining or means for communicating) may include the transceivers 254 and/or antenna(s) 252 of the user equipment 104 illustrated in FIG. 2 and/or transceiver 1008 and antenna 1010 of the communication device 1000 in FIG. 10.

In some examples, means for performing, means for triggering, means for maintaining, means for incrementing, means for receiving, and/or means for communicating may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including beam failure detection component 281).

Notably, FIG. 10 is an example, and many other examples and configurations of communication device 1000 are possible.

Figure 11:
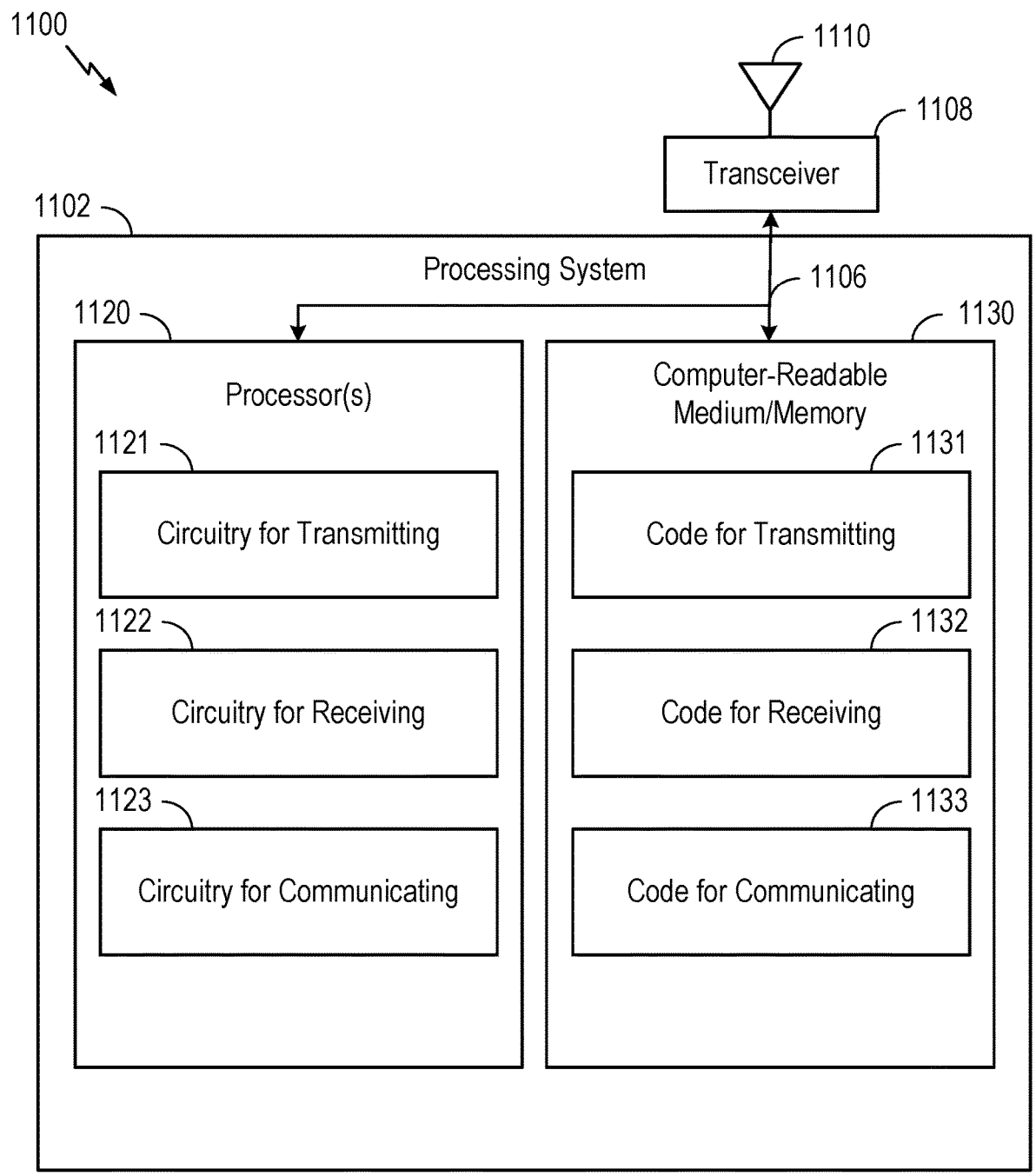
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 6-7B, and 9. In some examples, communication device 1100 may be a base station 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 6-7B, and 9, or other operations for performing the various techniques discussed herein for configuring beam failure detection per beam.

In the depicted example, computer-readable medium/memory 1130 stores code 1131 for transmitting, code 1132 for receiving, and/or code 1133 for communicating (e.g., transmitting and/or receiving).

In the depicted example, the one or more processors 1120 include circuitry configured to implement the code stored in the computer-readable medium/memory 1130, including circuitry 1121 for transmitting, circuitry 1122 for receiving, and/or circuitry 1123 for communicating.

Various components of communications device 1100 may provide means for performing the methods described herein, including with respect to FIGS. 6-7B, and 9.

In some examples, means for transmitting or sending (or means for outputting for transmission) may include the transceivers 232 and/or antenna(s) 234 of the base station 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for receiving, means for transmitting, and means for communicating may include various processing system components, such as: the one or more processors 1120 in FIG. 11, or aspects of the base station 102 depicted in FIG. 2, including receive processor 238, transmit processor 220, TX MIMO processor 230, and/or controller/processor 240 (including beam failure detection configuration component 241).

Notably, FIG. 11 is an example, and many other examples and configurations of communication device 1100 are possible.

Example Aspects

Implementation examples are described in the following numbered aspects:

Aspect 1: An apparatus for wireless communication, comprising: a memory; and a processor coupled to the memory, the processor and the memory are configured to: communicate with a network entity via a plurality of beams associated with a cell, perform a beam failure detection procedure per beam of the plurality of beams, and trigger a beam failure recovery procedure for a first beam of the plurality of beams in response to detecting a first beam failure for the first beam.

Aspect 2: The apparatus of Aspect 1, wherein the processor and the memory are further configured to: perform a beam failure detection procedure per beam including maintaining, for each beam, a corresponding counter based on a number of times a beam failure instance (BFI) occurs for the beam, and detect the first beam failure for the first beam if the counter for the first beam satisfies a first counter threshold.

Aspect 3: The apparatus of Aspect 2, wherein a BFI occurs for the beam when a quality of the beam fails to satisfy a quality threshold.

Aspect 4: The apparatus according to any of Aspects 2 or 3, wherein the processor and the memory are further configured to start, for each beam, a corresponding beam failure detection timer in response to the BFI occurring for the beam and reset, for each beam, the corresponding counter upon expiration of the beam failure detection timer.

Aspect 5: The apparatus according to any of Aspects 1-4, wherein the processor and the memory are further configured to receive signaling indicating, for each beam, corresponding beam failure detection parameters including at least one of a beam failure detection timer value or a counter threshold.

Aspect 6: The apparatus according to any of Aspects 2-5, wherein the processor and the memory are further configured to maintain the corresponding counter further based on a number of consecutive times the BFI occurs for the beam in a sequence of occasions.

Aspect 7: The apparatus of Aspect 6, wherein the processor and the memory are further configured to: increment the corresponding counter by at least a first value of a first function of the number of consecutive times the BFI occurs for the beam if the number of consecutive times the BFI occurs for the beam does not satisfy a first threshold; and increment the corresponding counter by at least a second value of a second function of the number of consecutive times the BFI occurs for the beam if the number of consecutive times the BFI occurs for the beam satisfies the first threshold.

Aspect 8: The apparatus of Aspect 7, wherein the first function comprises a product of a first parameter and the number of times the BFI occurs for the beam, and wherein the second function comprises the number of times the BFI occurs for the beam raised to the power of a second parameter.

Aspect 9: The apparatus of Aspect 8, wherein the first parameter has a first value between zero and one, and the second parameter has a second value greater than one.

Aspect 10: The apparatus according to any of Aspects 1-9, wherein the processor and the memory are further configured to receive signaling indicating, for each beam, corresponding beam failure detection parameters including at least one of an indication of a function for determining the corresponding counter based on the number of consecutive times the BFI occurs for the beam, or one or more parameters for the function.

Aspect 11: The apparatus according to any of Aspects 2-10, wherein the processor and the memory are further configured to determine the first counter threshold based at least in part on a number of consecutive times the BFI occurs for the first beam in a sequence of occasions.

Aspect 12: The apparatus of Aspect 11, wherein the processor and the memory are further configured to: set the first counter threshold to a first value if the number of consecutive times the BFI occurs for the first beam does not satisfy a first threshold; and set the first counter threshold to a second value less than the first value if the number of consecutive times the BFI occurs for the first beam satisfies the first threshold.

Aspect 13: The apparatus according to any of Aspects 1-12, wherein the processor and the memory are further configured to receive signaling indicating, for each beam, corresponding beam failure detection parameters including at least one of an indication of a function for determining a corresponding counter threshold, or one or more parameters for the function.

Aspect 14: The apparatus according to any of aspects Aspect 1-13, wherein the processor and the memory are further configured to perform the beam failure detection procedure per beam using a machine learning model.

Aspect 15: The apparatus of Aspect 14, wherein, for the first beam, the machine learning model takes as input at least one of a number of times a BFI occurs for the first beam or channel condition measurements associated with the first beam, wherein the machine learning model outputs detection of the first beam failure based on the input.

Aspect 16: The apparatus according to any of Aspects 1-15, wherein the processor and the memory are further configured to receive signaling indicating, for each beam, corresponding beam failure detection parameters including at least one of an indication of a machine learning algorithm for detecting beam failure, an indication of training data for the machine learning algorithm, or one or more parameters for the machine learning algorithm.

Aspect 17: An apparatus for wireless communication, comprising: a memory; and a processor coupled to the memory, the processor and the memory are configured to: transmit, to a user equipment (UE), signaling indicating, for each beam of a plurality of beams associated with a cell, corresponding beam failure detection parameters for performing beam failure detection for the beam, communicate with the UE via the plurality of beams, and receive, from the UE, a beam failure recovery request in response to a first beam failure for a first beam of the plurality of beams.

Aspect 18: The apparatus of Aspect 17, wherein, for each beam, the corresponding beam failure detection parameters include at least one of a beam failure detection timer value or a counter threshold.

Aspect 19: The apparatus according to any of Aspects 17 or 18, wherein, for each beam, the corresponding beam failure detection parameters include at least one of an indication of a function for determining a corresponding counter based on a number of consecutive times a beam failure indication (BFI) occurs for the beam, or one or more parameters for the function.

Aspect 20: The apparatus according to any of Aspects 17-19, wherein, for each beam, the corresponding beam failure detection parameters include at least one of an indication of a function for determining a corresponding counter threshold, or one or more parameters for the function.

Aspect 21: The apparatus according to any of Aspects 17-20, wherein, for each beam, the corresponding beam failure detection parameters include at least one of an indication of a machine learning algorithm for detecting beam failure, an indication of training data for the machine learning algorithm, or one or more parameters for the machine learning algorithm.

Aspect 22: A method of wireless communication by a user equipment, comprising: communicating with a network entity via a plurality of beams associated with a cell; performing a beam failure detection procedure per beam of the plurality of beams; and triggering a beam failure recovery procedure for a first beam of the plurality of beams in response to detecting a first beam failure for the first beam.

Aspect 23: The method of Aspect 22, wherein performing the beam failure detection procedure per beam comprises, for each beam, maintaining a corresponding counter based on a number of times a beam failure instance (BFI) occurs for the beam, and wherein detecting the first beam failure for the first beam comprises the counter for the first beam satisfying a first counter threshold.

Aspect 24: The method of Aspect 23, wherein a BFI occurs for the beam when a quality of the beam fails to satisfy a quality threshold.

Aspect 25: The method according to any of Aspects 23 or 24, wherein performing the beam failure detection procedure per beam comprises, for each beam, starting a corresponding beam failure detection timer in response to the BFI occurring for the beam and resetting the corresponding counter upon expiration of the beam failure detection timer.

Aspect 26: The method according to any of Aspect 22-25, further comprising receiving signaling indicating, for each beam, corresponding beam failure detection parameters including at least one of a beam failure detection timer value or a counter threshold.

Aspect 27: The method according to any of Aspects 23-26, wherein, for each beam, maintaining the corresponding counter is further based on a number of consecutive times the BFI occurs for the beam in a sequence of occasions.

Aspect 28: The method of Aspect 27, wherein, for each beam, maintaining the corresponding counter comprises: incrementing the corresponding counter by at least a first value of a first function of the number of consecutive times the BFI occurs for the beam if the number of consecutive times the BFI occurs for the beam does not satisfy a first threshold; and incrementing the corresponding counter by at least a second value of a second function of the number of consecutive times the BFI occurs for the beam if the number of consecutive times the BFI occurs for the beam satisfies the first threshold.

Aspect 29: The method of Aspect 28, wherein the first function comprises a product of a first parameter and the number of times the BFI occurs for the beam, and wherein the second function comprises the number of times the BFI occurs for the beam raised to the power of a second parameter.

Aspect 30: The method of Aspect 29, wherein the first parameter has a first value between zero and one, and the second parameter has a second value greater than one.

Aspect 31: The method according to any of Aspects 26-30, further comprising receiving signaling indicating, for each beam, corresponding beam failure detection parameters including at least one of an indication of a function for determining the corresponding counter based on the number of consecutive times the BFI occurs for the beam, or one or more parameters for the function.

Aspect 32: The method according to any of Aspects 23-31, further comprising determining the first counter threshold based at least in part on a number of consecutive times the BFI occurs for the first beam in a sequence of occasions.

Aspect 33: The method of Aspect 32, wherein determining the first counter threshold comprises: setting the first counter threshold to a first value if the number of consecutive times the BFI occurs for the first beam does not satisfy a first threshold; and setting the first counter threshold to a second value less than the first value if the number of consecutive times the BFI occurs for the first beam satisfies the first threshold.

Aspect 34: The method according to any of Aspects 22-33, further comprising receiving signaling indicating, for each beam, corresponding beam failure detection parameters including at least one of an indication of a function for determining a corresponding counter threshold, or one or more parameters for the function.

Aspect 35: The method according to any of Aspects 22-34, wherein performing the beam failure detection procedure per beam comprises using a machine learning model.

Aspect 36: The method of Aspect 35, wherein, for the first beam, the machine learning model takes as input at least one of a number of times a BFI occurs for the first beam or channel condition measurements associated with the first beam, wherein the machine learning model outputs detection of the first beam failure based on the input.

Aspect 37: The method according to any of Aspects 22-36, further comprising receiving signaling indicating, for each beam, corresponding beam failure detection parameters including at least one of an indication of a machine learning algorithm for detecting beam failure, an indication of training data for the machine learning algorithm, or one or more parameters for the machine learning algorithm.

Aspect 38: A method of wireless communication by a network entity, comprising: transmitting, to a user equipment (UE), signaling indicating, for each beam of a plurality of beams associated with a cell, corresponding beam failure detection parameters for performing beam failure detection for the beam; communicating with the UE via the plurality of beams; and receiving, from the UE, a beam failure recovery request in response to a first beam failure for a first beam of the plurality of beams.

Aspect 39: The method of Aspect 38, wherein, for each beam, the corresponding beam failure detection parameters include at least one of a beam failure detection timer value or a counter threshold.

Aspect 40: The method according to any of Aspects 38 or 39, wherein, for each beam, the corresponding beam failure detection parameters include at least one of an indication of a function for determining a corresponding counter based on a number of consecutive times a beam failure indication (BFI) occurs for the beam, or one or more parameters for the function.

Aspect 41: The method according to any of Aspects 38-40, wherein, for each beam, the corresponding beam failure detection parameters include at least one of an indication of a function for determining a corresponding counter threshold, or one or more parameters for the function.

Aspect 42: The method according to any of Aspects 38-41, wherein, for each beam, the corresponding beam failure detection parameters include at least one of an indication of a machine learning algorithm for detecting beam failure, an indication of training data for the machine learning algorithm, or one or more parameters for the machine learning algorithm.

Aspect 43. An apparatus comprising means for performing the method of any of Aspects 22 through 42.

Aspect 44. An apparatus comprising at least one processor and a memory coupled to the at least one processor, the memory comprising code executable by the at least one processor to cause the apparatus to perform the method of any of Aspects 22 through 42.

Aspect 45. A computer readable medium storing computer executable code thereon for wireless communications that, when executed by at least one processor, cause an apparatus to perform the method of any of Aspects 22 through 42.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration. For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of beam failure detection in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
   memory; and
   one or more processors coupled to the memory, the one or more processors, individually or collectively, and the memory being configured to:
      receive signaling indicating, for each beam of a plurality of beams associated with a cell, corresponding beam failure detection parameters for performing beam failure detection for the beam, the beam failure detection parameters for at least two of the plurality of beams being different, wherein the beam failure detection parameters include at least one of:
         an indication of a function for determining a corresponding counter threshold, or
         one or more parameters for the function,
      communicate with a network entity via the plurality of beams associated with the cell,
      perform a beam failure detection procedure per beam of the plurality of beams based on the beam failure detection parameters, and
      trigger a beam failure recovery procedure for a first beam of the plurality of beams in response to detecting a first beam failure for the first beam.

2. The apparatus of claim 1, wherein the one or more processors, individually or collectively, and the memory are further configured to:
   perform the beam failure detection procedure per beam including maintaining, for each beam, a corresponding counter based on a number of times a beam failure instance (BFI) occurs for the beam, and
   detect the first beam failure for the first beam if the counter for the first beam satisfies the counter threshold.

3. The apparatus of claim 1, wherein a beam failure instance (BFI) occurs for the beam when a quality of the beam fails to satisfy a quality threshold.

4. The apparatus of claim 2, wherein the one or more processors, individually or collectively, and the memory are further configured to start, for each beam, a corresponding beam failure detection timer in response to the BFI occurring for the beam and reset, for each beam, the corresponding counter upon expiration of the beam failure detection timer.

5. The apparatus of claim 2, wherein the beam failure detection parameters include at least one of a beam failure detection timer value or the counter threshold.

6. The apparatus of claim 2, wherein the one or more processors, individually or collectively, and the memory are further configured to maintain the corresponding counter further based on a number of consecutive times the BFI occurs for the beam in a sequence of occasions.

7. The apparatus of claim 6, wherein the one or more processors, individually or collectively, and the memory are further configured to:
   increment the corresponding counter by at least a third value of a first function of the number of consecutive times the BFI occurs for the beam if the number of consecutive times the BFI occurs for the beam does not satisfy a first threshold; and
   increment the corresponding counter by at least a fourth value of a second function of the number of consecutive times the BFI occurs for the beam if the number of consecutive times the BFI occurs for the beam satisfies the first threshold.

8. The apparatus of claim 7, wherein the first function comprises a product of a first parameter and the number of times the BFI occurs for the beam, and wherein the second function comprises the number of times the BFI occurs for the beam raised to a power of a second parameter.

9. The apparatus of claim 8, wherein the first parameter has a first value between zero and one, and the second parameter has a second value greater than one.

10. The apparatus of claim 6, wherein the beam failure detection parameters include at least one of an indication of a function for determining the corresponding counter based on the number of consecutive times the BFI occurs for the beam, or one or more parameters for the function.

11. The apparatus of claim 2, wherein the one or more processors, individually or collectively, and the memory are further configured to determine the first counter threshold based at least in part on a number of consecutive times the BFI occurs for the first beam in a sequence of occasions.

12. The apparatus of claim 11, wherein the one or more processors, individually or collectively, and the memory are further configured to:
set the counter threshold to a first value if the number of consecutive times the BFI occurs for the first beam does not satisfy a first threshold; and
set the counter threshold to a second value less than the first value if the number of consecutive times the BFI occurs for the first beam satisfies the first threshold.

13. The apparatus of claim 1, wherein the one or more processors, individually or collectively, and the memory are further configured to perform the beam failure detection procedure per beam using a machine learning model.

14. The apparatus of claim 13, wherein, for the first beam, the machine learning model takes as input at least one of a number of times a BFI occurs for the first beam or channel condition measurements associated with the first beam, wherein the machine learning model outputs detection of the first beam failure based on the input.

15. The apparatus of claim 1, wherein the beam failure detection parameters include at least one of an indication of a machine learning algorithm for detecting beam failure, an indication of training data for the machine learning algorithm, or one or more parameters for the machine learning algorithm.

16. An apparatus for wireless communication, comprising:
memory; and
one or more processors coupled to the memory, the one or more processors, individually or collectively, and the memory being configured to:
transmit, to a user equipment (UE), signaling indicating, for each beam of a plurality of beams associated with a cell, corresponding beam failure detection parameters for performing beam failure detection for the beam, the beam failure detection parameters for at least two of the plurality of beams being different, wherein, for each beam, the corresponding beam failure detection parameters include at least one of:
an indication of a function for determining a corresponding counter threshold, or
one or more parameters for the function,
communicate with the UE via the plurality of beams, and
receive, from the UE, a beam failure recovery request in response to a first beam failure for a first beam of the plurality of beams.

17. The apparatus of claim 16, wherein, for each beam, the corresponding beam failure detection parameters include at least one of a beam failure detection timer value or the counter threshold.

18. The apparatus of claim 16, wherein, for each beam, the corresponding beam failure detection parameters include at least one of an indication of a function for determining a corresponding counter based on a number of consecutive times a beam failure indication (BFI) occurs for the beam, or one or more parameters for the function.

19. The apparatus of claim 16, wherein, for each beam, the corresponding beam failure detection parameters include at least one of an indication of a machine learning algorithm for detecting beam failure, an indication of training data for the machine learning algorithm, or one or more parameters for the machine learning algorithm.

20. A method of wireless communication by a user equipment, comprising:
receiving signaling indicating, for each beam of a plurality of beams associated with a cell, corresponding beam failure detection parameters for performing beam failure detection for the beam, the beam failure detection parameters for at least two of the plurality of beams being different, wherein the beam failure detection parameters include at least one of:
an indication of a function for determining a corresponding counter threshold, or
one or more parameters for the function,
communicating with a network entity via the plurality of beams associated with the cell;
performing a beam failure detection procedure per beam of the plurality of beams; and
triggering a beam failure recovery procedure for a first beam of the plurality of beams in response to detecting a first beam failure for the first beam.

21. The method of claim 20, wherein performing the beam failure detection procedure per beam comprises, for each beam, maintaining a corresponding counter based on a number of times a beam failure instance (BFI) occurs for the beam, and wherein detecting the first beam failure for the first beam comprises the counter for the first beam satisfying a first the counter threshold.

22. The method of claim 21, wherein, for each beam, maintaining the corresponding counter is further based on a number of consecutive times the BFI occurs for the beam in a sequence of occasions.

23. The method of claim 21, further comprising determining the first counter threshold based at least in part on a number of consecutive times the BFI occurs for the first beam in a sequence of occasions.

24. The method of claim 20, wherein performing the beam failure detection procedure per beam comprises using a machine learning model.

25. A method of wireless communication by a network entity, comprising:
transmitting, to a user equipment (UE), signaling indicating, for each beam of a plurality of beams associated with a cell, corresponding beam failure detection parameters for performing beam failure detection for the beam, the beam failure detection parameters for at least two of the plurality of beams being different, wherein, for each beam, the corresponding beam failure detection parameters include at least one of:

an indication of a function for determining a corresponding counter threshold, or one or more parameters for the function;

communicating with the UE via the plurality of beams; and receiving, from the UE, a beam failure recovery request in response to a first beam failure for a first beam of the plurality of beams.

26. The method of claim 25, wherein, for each beam, the corresponding beam failure detection parameters include at least one of a beam failure detection timer value or the counter threshold.

27. The method of claim 25, wherein, for each beam, the corresponding beam failure detection parameters further include at least one of an indication of another function for determining a corresponding counter based on a number of consecutive times a beam failure indication (BFI) occurs for the beam, or one or more parameters for the other function.

28. The method of claim 25, wherein, for each beam, the corresponding beam failure detection parameters include at least one of an indication of a machine learning algorithm for detecting beam failure, an indication of training data for the machine learning algorithm, or one or more parameters for the machine learning algorithm.

* * * * *